(12) United States Patent
Kikuchi

(10) Patent No.: US 10,825,106 B2
(45) Date of Patent: Nov. 3, 2020

(54) DOCUMENT MANAGEMENT SYSTEM

(71) Applicants: KABUSHIKI KAISHA TOSHIBA, Tokyo (JP); TOSHIBA TEC KABUSHIKI KAISHA, Tokyo (JP)

(72) Inventor: Yoshitaka Kikuchi, Toyonaka Osaka (JP)

(73) Assignees: KABUSHIKI KAISHA TOSHIBA, Tokyo (JP); TOSHIBA TEC KABUSHIKI KAISHA, tok (JP)

( * ) Notice: Subject to any disclaimer, the term of this patent is extended or adjusted under 35 U.S.C. 154(b) by 200 days.

(21) Appl. No.: 15/891,044

(22) Filed: Feb. 7, 2018

(65) Prior Publication Data
US 2019/0019257 A1 Jan. 17, 2019

(30) Foreign Application Priority Data
Jul. 11, 2017 (JP) .................................. 2017-135493

(51) Int. Cl.
*G06Q 40/00* (2012.01)
*G06K 7/14* (2006.01)
*G06K 7/10* (2006.01)

(52) U.S. Cl.
CPC ......... *G06Q 40/12* (2013.12); *G06K 7/10722* (2013.01); *G06K 7/1417* (2013.01)

(58) Field of Classification Search
None
See application file for complete search history.

(56) References Cited

U.S. PATENT DOCUMENTS

| | | | | |
|---|---|---|---|---|
| 7,170,391 | B2 * | 1/2007 | Lane | G06K 19/025 340/5.82 |
| 7,665,679 | B2 * | 2/2010 | Hamasuna | B02C 18/0007 241/36 |
| 7,926,752 | B2 * | 4/2011 | Kubo | B02C 18/0007 241/100 |
| 8,612,356 | B2 * | 12/2013 | Hutchinson | G06Q 30/02 705/14.4 |
| 9,843,587 | B2 * | 12/2017 | Meunier | G06F 21/57 |
| 10,013,411 | B2 * | 7/2018 | Sherry | G06F 17/218 |

(Continued)

FOREIGN PATENT DOCUMENTS

JP 2014-089575 A 5/2014

*Primary Examiner* — Fateh M Obaid
(74) *Attorney, Agent, or Firm* — Kim & Stewart LLP

(57) ABSTRACT

A document management system includes first and second terminals and a server, wherein processing tasks of the first terminal is offloaded to the server and results of the processing tasks are delivered to the second terminal. The first terminal transmits document preparation data and a destination address corresponding to a user. The server receives the document preparation data and the destination address, generates a document code indicating a classification of document contents and the document, stores the document, and controls transmissions of the document code and a storage address of the document to the destination address. The second terminal receives the document code and storage address, downloads the document based on the information indicating the storage address of the document, and stores the downloaded document in a storage device of the second terminal at a location determined based on the classification of document contents included in the document code.

5 Claims, 7 Drawing Sheets

(56) References Cited

U.S. PATENT DOCUMENTS

| | | | |
|---|---|---|---|
| 2012/0066048 A1* | 3/2012 | Foust | G06Q 30/0225 705/14.26 |
| 2013/0185148 A1* | 7/2013 | Townsend | G06Q 20/3223 705/14.49 |
| 2014/0073410 A1* | 3/2014 | Ramos | A63F 13/27 463/25 |
| 2014/0095276 A1* | 4/2014 | Sutcliffe | G07F 17/42 705/14.1 |
| 2015/0096813 A1* | 4/2015 | Aumente | G07B 15/00 177/245 |

* cited by examiner

| | ITEM CLASSIFICATION | ITEM NAME | STORAGE DESTINATION FOLDER NAME |
|---|---|---|---|
| | 01 | ENTERTAINMENT EXPENSES | FOLDER 1 |
| | 02 | WELFARE EXPENSES | FOLDER 2 |
| | 03 | CONSUMABLE EXPENSES | FOLDER 3 |
| | 04 | TRAVELING EXPENSES | FOLDER 4 |
| | ⋮ | ⋮ | ⋮ |

| 1 | 2 | 3 | 4 | 5 | 6 | 7 | 8 | 9 | 10 | 11 | 12 |
|---|---|---|---|---|---|---|---|---|----|----|----|
| A | B |   |   | C |   | D |   | E |    |    |    |

VOUCHER

VOUCHER CODE :110001790123

ISSUE DATE :2017501 — 72

| ADDRESS | | | — 73 |
| ACCOUNT TITLE | QUANTITY | AMOUNT | — 76 |
| ISSUING SOURCE | | | — 77 |

74

75

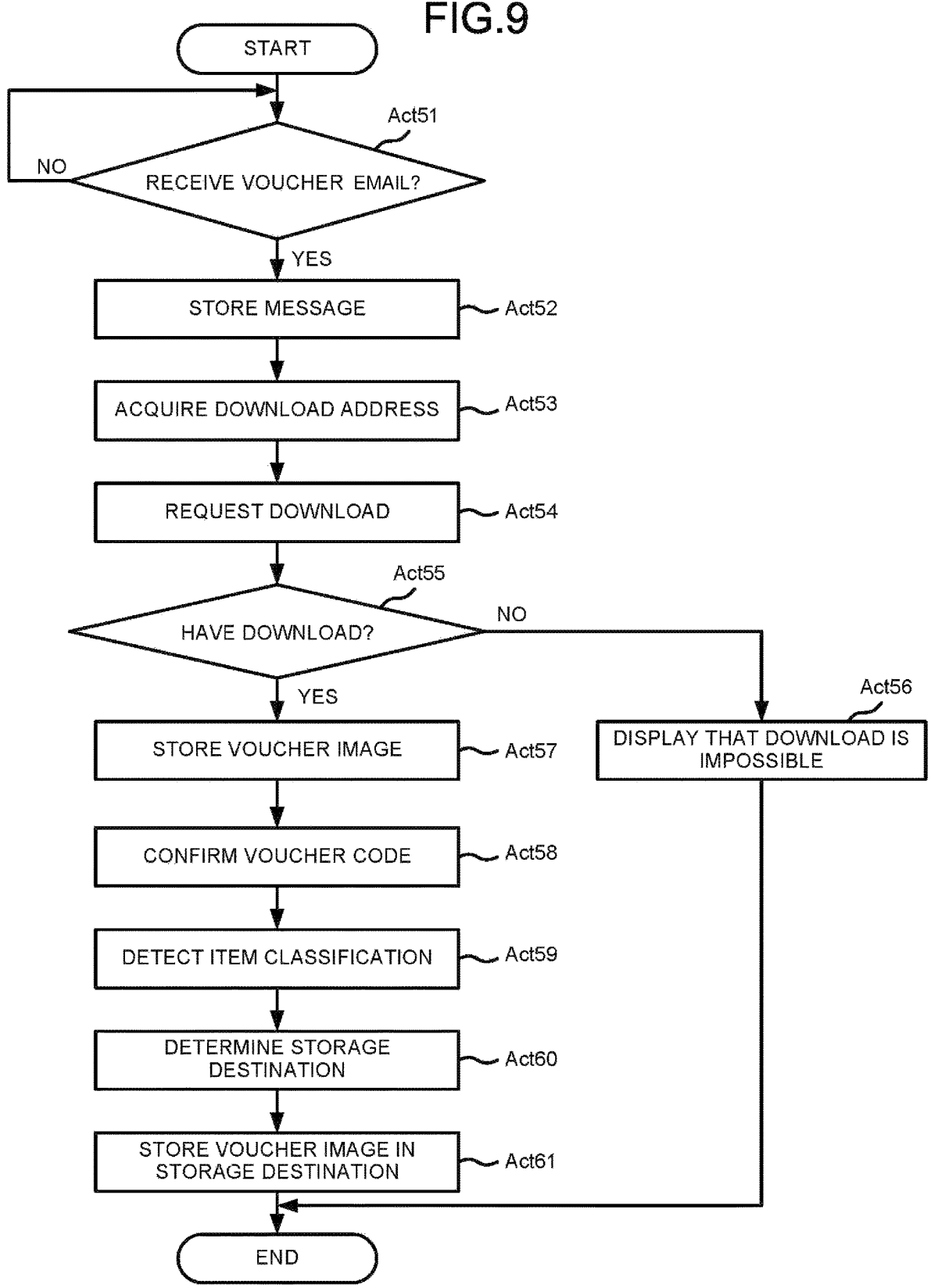

DOCUMENT MANAGEMENT SYSTEM

CROSS-REFERENCE TO RELATED APPLICATION

This application is based upon and claims the benefit of priority from Japanese Patent Application No. 2017-135493, filed Jul. 11, 2017, the entire contents of which are incorporated herein by reference.

FIELD

Embodiments described herein relate generally to a document management system.

BACKGROUND

A voucher is a document that a cash recipient issues to a cash payer, for example, at the time cash is handed over for a transaction for a commodity or a service. The voucher printed on a paper medium and received by the cash payer can be digitized using a photographing function of a digital camera, a smartphone and the like, and stored in a storage medium. The cash payer can also receive an electronic voucher by using an email. For this reason, it is expected that more and more enterprises will store the voucher as electronic data.

The voucher is a proof of tax expense. However, categories of the expense include a wide variety of expenses such as entertainment expenses, welfare expenses, consumable expenses, traveling expenses, and the like. Therefore, at the time of storing the voucher as electronic data, it is more efficient to perform sorting based on the category of the expense.

DESCRIPTION OF THE DRAWINGS

FIG. 5 is a diagram illustrating an example of a voucher code;

FIG. 6 is a diagram illustrating an example of a voucher;

FIG. 9 is a flowchart illustrating the main processing procedures executed by a document management apparatus according to an alternative embodiment.

DETAILED DESCRIPTION

A document management system according to an embodiment includes first and second terminals and a server, wherein processing tasks of the first terminal is offloaded to the server and results of the processing tasks are delivered to the second terminal. The first terminal receives document preparation data for preparing a document, and transmits the document preparation data and a destination address corresponding to a user who requests the document. The server receives the document preparation data and the destination address, and generates, based on the received document preparation data, a document code that includes information indicating a classification of document contents. The server further generates, based on the received document preparation data, a document, and stores the generated document. The server control transmissions of the generated document code and information indicating a storage address of the generated document to the destination address. The second terminal receives the generated document code and information indicating the storage address of the generated document that were transmitted to the destination address, downloads the document based on the information indicating the storage address of the generated document, and stores the downloaded document in a storage device of the second terminal at a location determined based on the classification of document contents included in the document code.

Hereinafter, an embodiment of a document management system including a document management apparatus which can sort the electronic data of the voucher for each category of the expense is described with reference to the accompanying drawings.

First Embodiment

Figure 1:
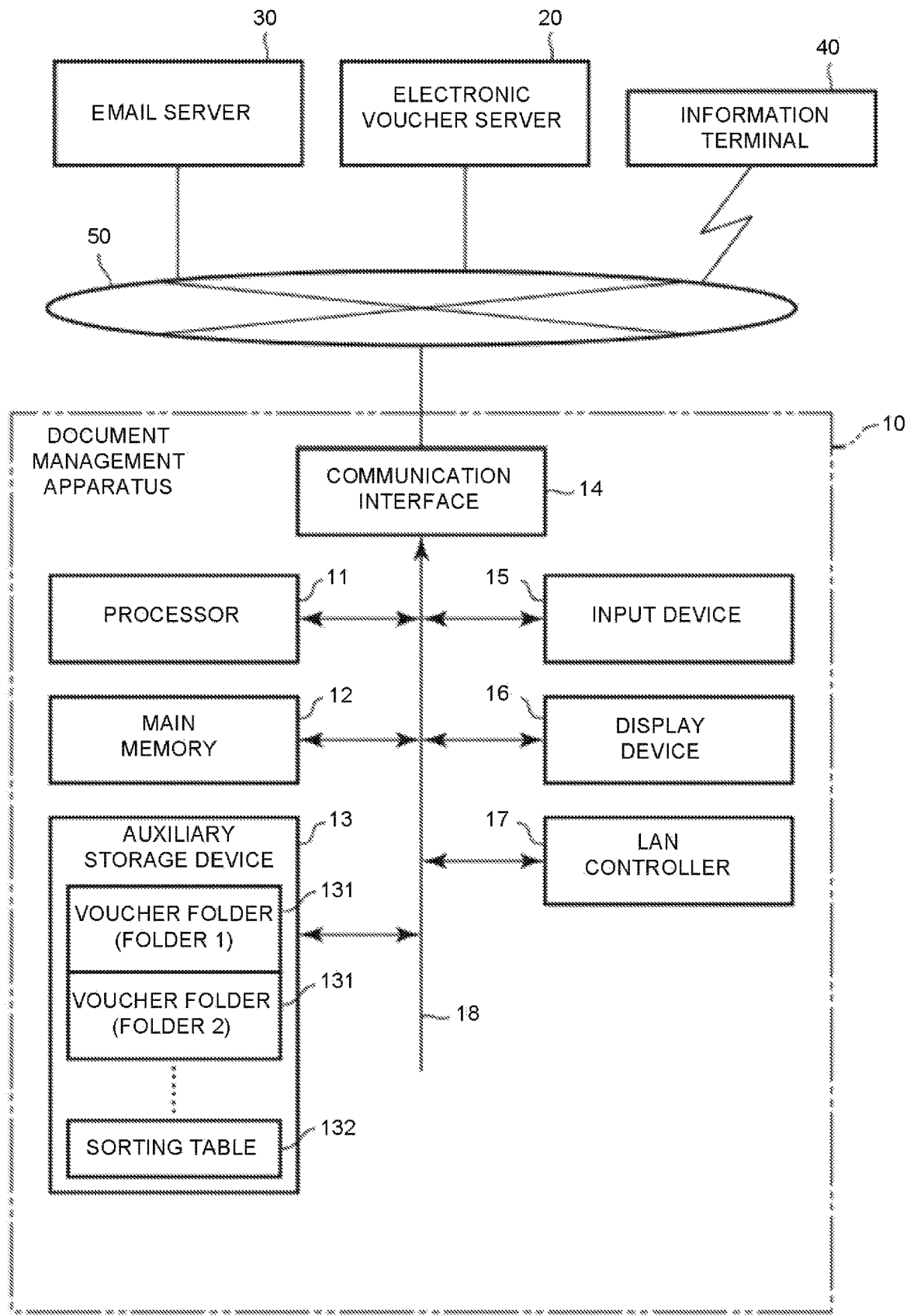
FIG. 1 is a block diagram illustrating a schematic configuration of an electronic voucher system including a document management apparatus.

FIG. 1 is a block diagram illustrating a schematic configuration of an electronic voucher system capable of receiving electronic voucher by using an email, including a document management apparatus 10 for providing the voucher to a recipient as a part of the same system.

The electronic voucher system includes the document management apparatus 10, an electronic voucher server 20, an email server 30, an information terminal 40, and a communication network 50. The document management apparatus 10, the electronic voucher server 20, the email server 30 and the information terminal 40 are connected to the communication network 50, forming the electronic voucher system. The communication network 50 may be an Internet, a VPN (virtual private network), a LAN (local area network), a public communication network, a mobile communication network and the like singly or in appropriate combination. In FIG. 1, only one document management apparatus 10, one electronic voucher server 20, one email server 30, and one information terminal 40 are shown, but the number of these devices is not particularly limited.

The information terminal 40 includes an input device, a display device, a camera, a wireless or wired communication module, and the like. The information terminal 40 is connected to the communication network 50 by wired communication or wireless communication. The information terminal 40 is typically operated by a payer who pays cash for a transaction such as sales of a commodity or a service. By this operation, the information terminal 40 acquires data necessary for creating a voucher, i.e., so-called voucher preparation data, and transmits the acquired voucher preparation data to the electronic voucher server 20 via the communication network 50. The information terminal 40 can be any one of various existing devices such as a smartphone, a tablet terminal, a mobile phone device, a multimedia terminal or a personal computer.

The electronic voucher server 20 creates the electronic data of the voucher based on the information received from the information terminal 40. Then, the electronic voucher server 20 stores the electronic data of the voucher in a PDF file format in a storage device of the server 20, for example.

The file format of electronic data is not limited to PDF. For example, the electronic data of the voucher may be stored in a file format such as TIFF, JPEG or the like.

The email server 30 generates an email indicating that the electronic voucher server 20 stores the electronic data of the voucher. Then, the email server 30 transmits the email to the document management apparatus 10 designated as a notification destination via the communication network 50.

The document management apparatus 10 includes a processor 11, a main memory 12, an auxiliary storage device 13, a communication interface 14, an input device 15, a display device 16, a LAN controller 17, and a system transmission path 18. The processor 11, the main memory 12, the auxiliary storage device 13, the communication interface 14, the input device 15, the display device 16, and the LAN controller 17 are connected by the system transmission path 18. In the document management apparatus 10, the processor 11, the main memory 12, and the auxiliary storage device 13 are connected by the system transmission path 18, thereby functioning as a computer that executes an information processing for controlling the document management apparatus 10. Such a document management apparatus 10 is typically provided as a personal computer.

The processor 11 acts as a central processor of the computer. The processor 11 controls each component to realize various functions as the document management apparatus 10 according to an operating system and an application program.

The main memory 12 acts as a main memory device of the computer. The main memory 12 includes a nonvolatile memory area and a volatile memory area. The main memory 12 stores an operating system and an application program in a nonvolatile memory area. In addition, the main memory 12 stores data necessary for executing a processing for controlling each section by the processor 11 in a nonvolatile or volatile memory area in some cases. The main memory 12 uses a volatile memory area as a work area where data is appropriately rewritten by the processor 11.

The auxiliary storage device 13 acts as an auxiliary storage device of the computer. The auxiliary storage device 13 may be, for example, an EEPROM (electric erasable programmable read-only memory), a HDD (hard disc drive), a SSD (solid state drive), or other various well-known storage devices. The auxiliary storage device 13 stores data used for various processing by the processor 11 and data generated by the processing by the processor 11. The auxiliary storage device 13 also stores the application program in some cases.

The communication interface 14 performs data communication via the communication network 50. As the communication interface 14, for example, a well-known device that executes a well-known processing for data communication via the Internet can be used.

The input device 15 inputs various instructions by an operator. As the input device 15, well-known devices such as a touch sensor or a keyboard can be applied singly or in combination.

The display device 16 displays various screens for providing the operator various information. As the display device 16, for example, a well-known device such as a liquid crystal display device can be used.

The LAN controller 17 controls transmission and reception of data to and from other devices connected via a LAN.

The system transmission path 18 includes an address bus line, a data bus line, a control signal line, and the like, and transmits the data and a control signal among the connected components.

The document management apparatus 10 as described above is provided in an enterprise for use by a payer who pays the cash for the transaction. The document management apparatus 10 includes a function as a reception module for receiving an email transmitted from the email server 30. The document management apparatus 10 also includes a function as a detection module that detects the category with an amount of the voucher notified by the email set as the expense, based on the email received by the reception module and a function as a sorting module which sorts the electronic data of the voucher based on the detected category.

The document management apparatus 10 implements email software (application program) to realize the function as the reception module. The document management apparatus 10 implements a voucher management program (application program) to realize the functions as the detection module and the sorting module. The email software and the voucher management program are stored in the main memory 12 or the auxiliary storage device 13.

The document management apparatus 10 designates a plurality of voucher folders 131 and a sorting table 132 in the auxiliary storage device 13 as storage areas used by the voucher management program. The plurality of the voucher folders 131 stores the electronic data of each voucher respectively. The sorting table 132 stores data for identifying which voucher folder 131 the electronic data of each voucher is stored in.

Figures 2, 3:
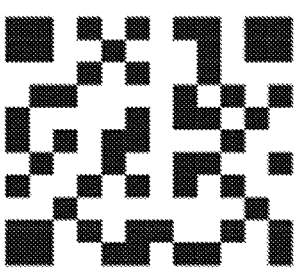
FIG. 2 is a diagram illustrating an example of data stored in a sorting table.
FIG. 3 is a diagram illustrating an example of a receipt.

FIG. 2 is a diagram illustrating an example of the data stored in the sorting table 132. As shown in FIG. 2, the sorting table 132 includes an item classification field F1, an item name field F2, and a storage destination folder name field F3. In the field F1, a unique item classification preset for the categories of various expenses is set. In the field F2, a name of the category specified by the corresponding item classification is set. In the field F3, a folder name of the voucher folder 131 storing the electronic data of the voucher which is the expense of the category specified by the corresponding item classification is set.

The data of the item classification "01" in the sorting table 132 shown in FIG. 2 indicates that the electronic data of the voucher which is the expense of the category "entertainment expenses" specified by the item classification "01" is stored in the voucher folder 131 with a folder name "FOLDER 1". The data of the item classification "02" indicates that the electronic data of the voucher which is the expense of the category "welfare expenses" specified by the item classification "02" is stored in the voucher folder 131 with a folder name "FOLDER 2". The data of the item classification "03" indicates that the electronic data of the voucher which is the expense of the category "consumable expenses" specified by the item classification "03" is stored in the voucher folder 131 with a folder name "FOLDER 3". The data of the item classification "04" indicates that the electronic data of the voucher which is the expense of the category "traveling expenses" specified by the item classification "04" is stored in the voucher folder 131 with a folder name "FOLDER 4".

By setting a common folder name for different categories, it is also possible to collectively store the electronic data of the voucher which is an expense of different categories in one voucher folder 131. For example, if the electronic data of the voucher for consumables such as printer ink, copy paper and the like and the electronic data of the voucher for office supplies such as writing material, an ink pad and the like are collectively managed, the folder name for the category "consumable expenses" and the folder name for the category "office supplies expenses" should be common.

Next, the operation of the electronic voucher system as described above is described. First, the operation until the electronic data of the voucher is created and the voucher is sent to a recipient side by the email is described with reference to FIG. 3 to FIG. 7. The contents of various processing described below are merely examples, and various processing capable of obtaining similar results can be appropriately used.

FIG. 3 shows an example of a receipt 60 issued from a POS (Point Of Sales) terminal if cash is provided in settlement of a transaction such as sales of the commodity or the service. As shown in FIG. 3, on the receipt 60, an electronic voucher issue code 62 is printed together with transaction contents 61 such as date and time when the transaction is performed, details, total amount and the like. The electronic voucher issue code 62 is a two-dimensional barcode of information for obtaining the voucher data. The electronic voucher issue code 62 is printed if the cash payer wishes to receive the voucher as the electronic data.

The voucher data includes a transaction date and time, a total amount, a total quantity, an issuing source identification code, and the like. The issuing source identification code is a unique code for individually identifying, for example, a retail shop, a restaurant, an accommodation facility, a transportation facility, etc. which are the issuing source of the voucher. Incidentally, the electronic voucher server 20 includes an issuing source database storing issuing source information (a shop name or a facility name, an address, a telephone number, etc.) of shops and facilities specified by the codes in association with various issuing source identification codes.

The cash payer who receives the receipt 60 reads the electronic voucher issue code 62 printed on the receipt 60 using a camera function of the information terminal 40.

Figure 4:
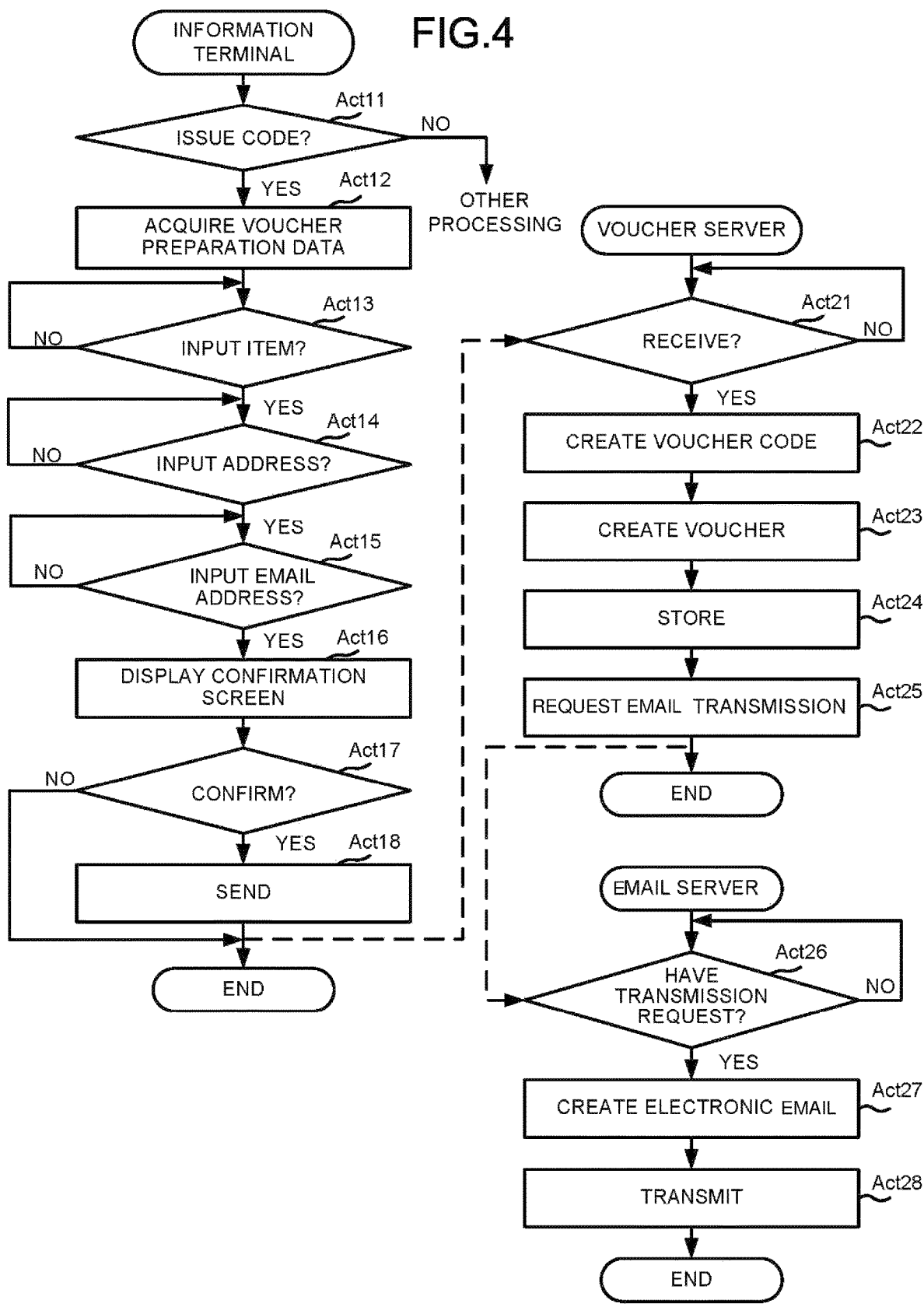
FIG. 4 is a flowchart illustrating the operation procedures of an information terminal, an electronic voucher server and an email server.

FIG. 4 is a flowchart illustrating the procedure of the information terminal 40 reading the electronic voucher issuing code 62, and the procedures of the electronic voucher server 20 and the email server 30 based on the operation of the information terminal 40.

The information terminal 40 first confirms whether or not the two-dimensional data code read by the camera function is the electronic voucher issue code 62 (Act 11). If a two-dimensional data code other than the electronic voucher issue code 62 is read (No in Act 11), the information terminal 40 executes other processing based on the two-dimensional data code.

If the two-dimensional data code indicating the electronic voucher issue code 62 is read (Yes in Act 11), the information terminal 40 acquires the voucher preparation data based on the electronic voucher issue code 62 (Act 12).

For example, it is assumed that the POS terminal stores the voucher preparation data relating to the transaction content 61 printed on the receipt 60 in a predetermined storage device. In this case, the POS terminal creates the electronic voucher issue code 62 by generating a two-dimensional barcode with the information indicating a storage destination of the voucher preparation data. The POS terminal then prints the electronic voucher issue code 62 on the receipt 60. The information terminal 40 identifies the storage destination from the electronic voucher issuing code 62 and accesses the storage destination by wireless communication to acquire the voucher preparation data. Alternatively, the POS terminal prints the electronic voucher issue code 62 obtained by generating a two-dimensional barcode corresponding to the voucher preparation data on the receipt 60. In this case, the POS terminal creates the electronic voucher issue code 62 by generating the two-dimensionally barcode corresponding to the voucher preparation data. The POS terminal then prints the electronic voucher issue code 62 on the receipt 60. The information terminal 40 analyzes the electronic voucher issue code 62 to obtain the voucher preparation data.

The information terminal 40, after acquiring the voucher preparation data, waits for the input of the item classification (Act 13). For example, the information terminal 40 displays a list of the category names on the display device and waits for until one of the categories is selected. For example, in a case of recording the amount of the voucher as office supplies expenses, the cash payer operates the input device to select the category "office supplies expenses" from the name list. The information terminal 40 recognizes that the item classification "03" of the category "office supplies expenses" is input if the category "office supplies expenses" is selected.

The information terminal 40 waits for until an address of the voucher is input (Act 14). For example, the information terminal 40 displays an address input column on the display device. The cash payer operates the input device to input a text indicating the address of the voucher, such as a company name, a group name, an individual name, etc., in the address input column. If text data is input in the address input column, the information terminal 40 recognizes the text data as the address.

The information terminal 40 waits until an email address which is a transmission destination of the voucher is input (Act 15). For example, the information terminal 40 displays an address input column on the display device. The cash payer operates the input device to input a text indicating the email address in the address input column. If text data is input in the address input column, the information terminal 40 recognizes the text data as the email address.

If the information terminal 40 recognizes that the item classification, the address, and the email address are all input (Yes in all of Act 13, Act 14 and Act 15), a confirmation screen is displayed on the display device (Act 16). On the confirmation screen, the input data of the item classification, the address, and the email address are displayed together with the transaction date and time, the total amount, the total quantity and the like of the voucher preparation data acquired from the electronic voucher issue code 62. The cash payer confirms the content of the confirmation screen to perform a confirmation operation. In the case in which there is an error in the input data, the cash payer executes a cancel operation.

The information terminal 4 which displays the confirmation screen confirms whether or not a confirmation operation is executed (Act 17). If the confirmation operation is executed (Yes in Act 17), the information terminal 40 transmits data (hereinafter, referred to as "voucher basic data") including the voucher preparation data (transaction date and time, the total amount, the total quantity, the issuing source identification code, etc.) and the input data (the item classification and the email address) to the electronic voucher server 20 using wired communication or wireless communication (Act 18). Through the above, the information terminal 40 terminates the processing. If the cancel operation is executed instead of the confirmation operation (No in Act 17), the information terminal 40 terminates the processing without transmitting the voucher basic data.

The electronic voucher server 20 waits until the voucher basic data is received from the information terminal 40 via the communication network 50 (Act 21). Then, if the voucher basic data is received (Yes in Act 21), the electronic voucher server 20 creates the voucher code based on the voucher basic data (Act 22).

FIG. 5 is a schematic diagram illustrating a system example of the voucher code 71. In the present embodiment, the voucher code 71 is a 12-digit digit sequence as shown in FIG. 5. Then, the first digit at the top is set to a value of an item A, three digits from the second digit to the fourth digit are a value of an item B, two digits of the fifth digit and the sixth digit are set to a value of an item C, and two digits of the seventh digit and the eighth digit are set to a value of an item D, and four digits of the ninth digit to the twelfth digit are set to a value of an item E. The item A is a tax classification for identifying whether the voucher is for the national tax or for the local tax. The item B is a classification of an administrative area where the tax matters of the voucher are carried out. The item C is an issue year of the voucher. The item D is the item classification included in the voucher basic data. The item E is a sequence number updated each time the voucher basic data is received.

The system of the voucher code 71 is not limited to that shown in FIG. 5. However, at least the item classification included in the voucher basic data is included at a predetermined digit position.

After the creation of the voucher code 71 is completed, the electronic voucher server 20 creates image data (electronic data) of the voucher (Act 23).

FIG. 6 is a schematic diagram illustrating an example of a voucher 70. In the voucher 70, a voucher code 71, an issue date 72, an address 73, a category 74, a quantity 75, an amount and issuing source information 77 are displayed at predetermined positions, respectively. The voucher code 71 is created by the processing in Act 22. The issue date 72 is the transaction date of the voucher preparation data. The address 73 is the address of the text data included in the input data. The category 74 is the item name set in the sorting table 132 in association with the item classification of the input data. The quantity 75 and the amount 76 are the total quantity and the total amount of the voucher preparation data. The issuing source information 77 is the issuing source information set in the issuing source database in association with the issuing source identification code of the voucher preparation data.

For example, as shown in FIG. 6, if the creation of the image data of the voucher 70 is completed, the electronic voucher server 20 stores the image data in the storage device managed by the server 20 (Act 24). Then, the electronic voucher server 20 requests the email server 30 via the communication network 50 to send an email with the email address included in the input data as the address. At this time, the electronic voucher server 20 notifies the email server 30 of a download address for downloading the image data of the voucher 70 from a storage location together with the voucher code 71, the issue date 72, the address 73, the amount 76 and the issuing source information 77 of the voucher 70 (Act 25). The download address is, for example, a URL (Uniform Resource Locator).

The email server 30 waits for an email transmission request (Act 26). Upon receiving the email transmission request (Yes in Act 26), the email server 30 creates the email according to the request (Act 27).

Figure 7:
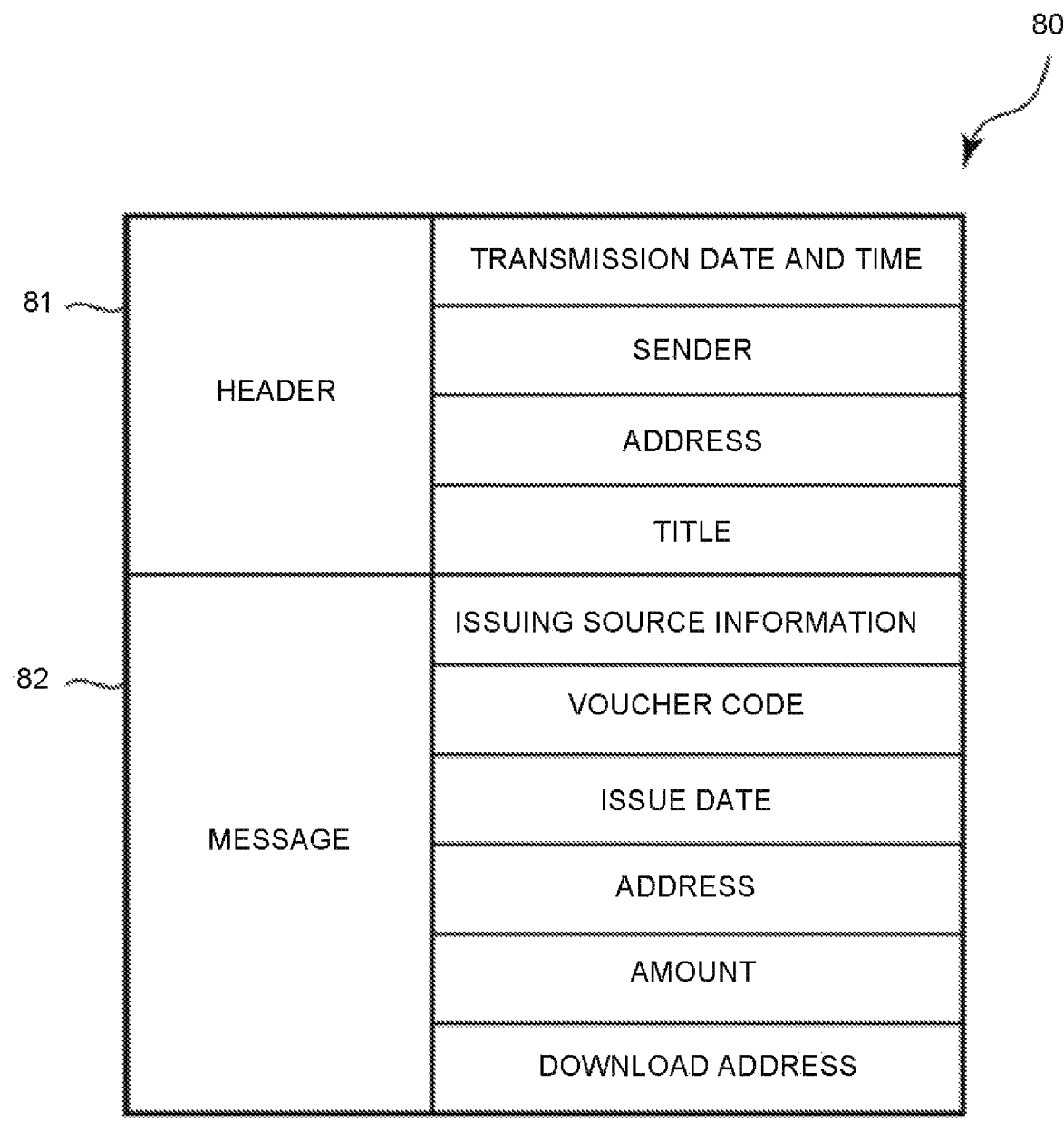
FIG. 7 is a diagram illustrating an example of a format of an email.

FIG. 7 is a diagram illustrating an example of the format of an email 80. The email 80 includes header data 81 and message data 82. The header data 81 includes items such as transmission date and time, a sender, a destination, and a title. The transmission date and time is the time at which the email is created. The time is acquired from a system clock provided in the email server 30. The sender is preset as the email server 30. The address is the email address notified from the electronic voucher server 20. The title is, for example, "electronic voucher".

The message data 82 includes the issuing source information 77, the voucher code 71, the issue date 72, the address 73, the amount 76, and the download address notified from the electronic voucher server 20.

The email server 30 transmits the email 80 via the communication network 50 (Act 28). The email 80 is transmitted with the email address of the header data 81, i.e., the email address input via the information terminal 40 by the cash payer as the address. Thus, in the document management apparatus 10 corresponding to the email address, the email 80 is received.

Figure 8:
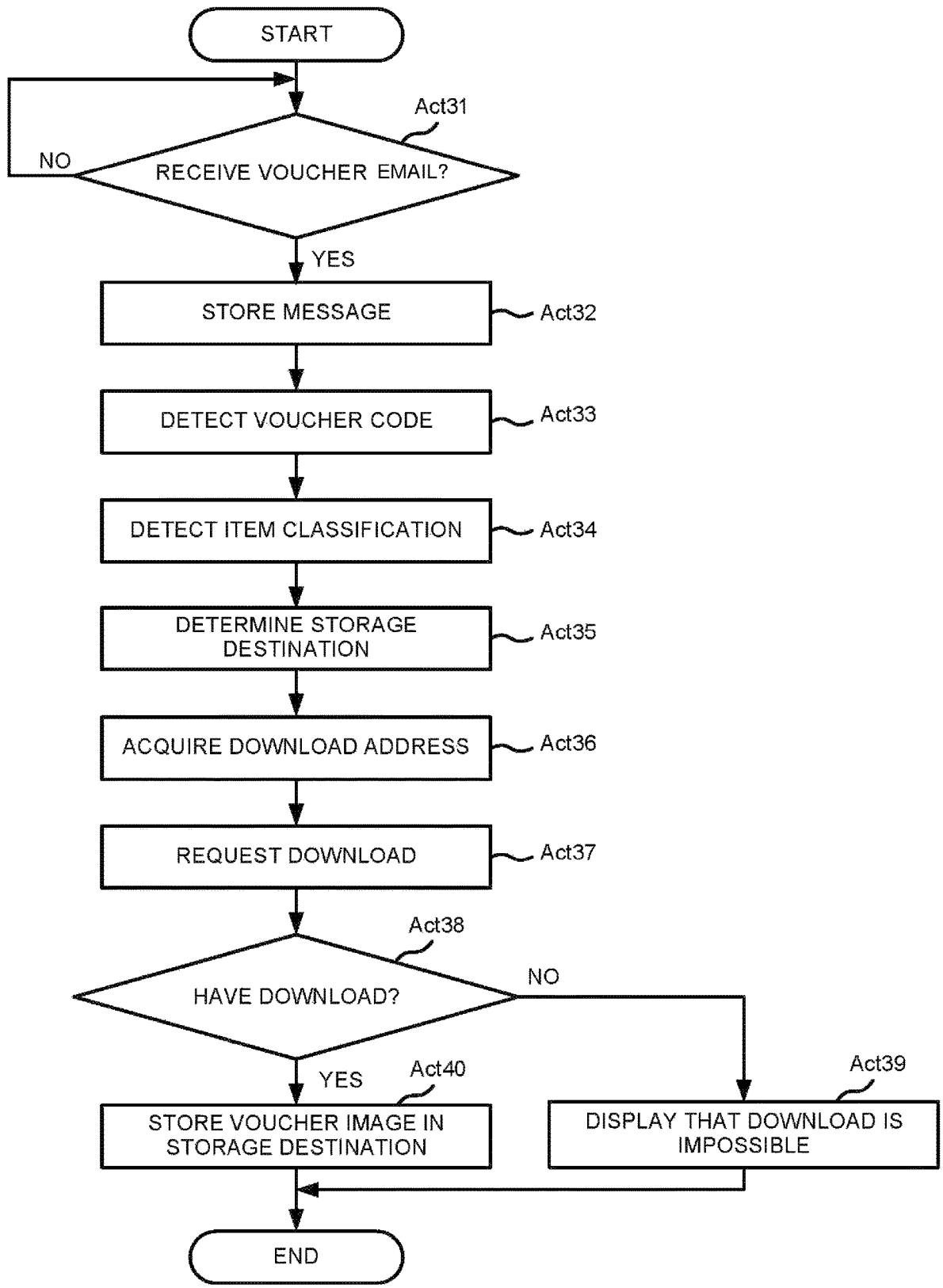
FIG. 8 is a flowchart illustrating the main processing procedures executed by a document management apparatus according to an embodiment.

Next, with reference to FIG. 8, the operation of acquiring and storing the image data of the voucher 70 in the document management apparatus 10 which receives the reception notification of the email 80 is described. The contents of various processing described below are merely examples, and various processing capable of acquiring similar results can be appropriately used.

FIG. 8 is a flowchart illustrating the processing procedures executed by the processor 11 of the document management apparatus 10 according to the voucher management program.

If the voucher management program is started, the processor 11 waits for until the email 80 (hereinafter, referred to as a voucher email 80) whose title is the "electronic voucher" is received via the communication interface 14 (Act 31). Then, if it is detected that the voucher email 80 is received (Yes in Act 31), the processor 11 stores the message data 82 corresponding to the voucher email 80 in a predetermined volatile memory area of the main memory 12.

Here, the processor 11 realizes a reception module by executing the processing in Act 31 and Act 32 in cooperation with the communication interface 14.

The processor 11 extracts the voucher code 71 from the message data 82 (Act 33). Then, the processor 11 detects the item classification corresponding to the item D from the voucher code 71 (Act 34).

Here, the processor 11 functions as a detection module by the processing in Act 33 and Act 34.

The processor 11 searches the sorting table 132 according to the item classification detected from the voucher code 71 and detects the storage destination folder name set corresponding to the item classification. Then, the processor 11 determines the voucher folder 131 having the folder name matching the storage destination folder name as the electronic data storage destination of the voucher 70 identified by the voucher email 80 (Act 35).

For example, if the item classification "01" is detected in the processing in Act 34, by referring to the sorting table 132 shown in FIG. 2, the voucher folder 131 in which the folder name "FOLDER 1" is set becomes the electronic data storage destination of the voucher 70. Similarly, if the item classification "02" is detected, the voucher folder 131 in which the folder name "FOLDER 2" is set becomes the electronic data storage destination of the voucher 70.

The processor 11 extracts the download address from the message data 82 (Act 36). Then, the processor 11 accesses the download address via the communication interface 14 and requests download of the data (Act 37).

The download address is used for downloading the image data of the voucher 70 from the storage location, and the storage location is a storage device of the electronic voucher server 20. The electronic voucher server 20 receiving the download request reads the image data of the voucher 70 from the storage device designated by the download address and downloads it to the document management apparatus 10 which is a request source, via the communication network 50.

The processor 11 of the document management apparatus 10 requesting the download determines the presence or absence of the download (Act 38). If the download is not completed within a predetermined time after the download is requested (No in Act 38), the processor 11 displays a message notifying that the download is impossible to the display device 16 (Act 39).

If the download is completed (Yes in Act 38), the processor 11 stores the downloaded data, i.e., the image data of the voucher 70 in the voucher folder 131 determined to be the storage destination by the processing in Act 35 (Act 40).

Therefore, for example, in the processing in Act 35, if the voucher folder 131 with the folder name "FOLDER 1" is determined as the electronic data storage destination, the downloaded image data of the voucher 70 is stored in the voucher folder 131 with the folder name "FOLDER 1". In other words, the image data of the voucher 70 in which the item classification included in the voucher code 71 is "01" is stored in the voucher folder 131 with the folder name "FOLDER 1". Similarly, if the voucher folder 131 set with the folder name "FOLDER 2" is determined as the electronic data storage destination, the downloaded image data of the voucher 70 is stored in the voucher folder 131 with the folder name "FOLDER 2". In other words, the image data of the voucher 70 in which the item classification included in the voucher code 71 is "02" is stored in the voucher folder 131 with the folder name "FOLDER 2".

Here, the processor 11 functions as a sorting module by executing the processing in Act 35 and Act 40.

The processor 11 displays a message indicating that the download is impossible or terminates the reception processing of the voucher email 80 if the image data of the voucher 70 is stored in the voucher folder 131. Thereafter, the processor 11 waits for the next voucher email 80, and if receiving the voucher email 80, the processor 11 again executes the processing in Act 32 to Act 40 in the same way as stated above.

As described above, in the electronic voucher system, the email for notifying the image data of the voucher 70, i.e., the so-called voucher email 80 is transmitted to the document management apparatus 10. The voucher email 80 contains the download address for downloading the image data of the voucher 70 from the storage location and the voucher code 71 as the message data 82. The voucher code 71 contains the item classification for specifying the category with the amount of the voucher 70 as the expense.

The processor 11 of the document management apparatus 10 receiving the voucher email 80 downloads the image data of the voucher 70 from the storage device of the electronic voucher server 20 designated by the download address. The processor 11 determines the voucher folder 131 for storing the image data of the voucher 70 from the plurality of the voucher folders 131 based on the item classification included in the voucher code 71. Then, the processor 11 stores the downloaded image data of the voucher 70 in the voucher folder 131 determined as the storage destination.

Therefore, according to the document management apparatus 10, since the image data of the vouchers 70 in which at least the categories are the same is stored collectively in one voucher folder 131, the image data of the voucher 70 can be sorted without trouble based on the category of the expense.

Second Embodiment

In the first embodiment, a case is described in which the voucher code 71 is acquired from the message data 82 of the voucher email 80 and the category is detected is exemplified. In the second embodiment, a case in which the voucher code 71 is acquired from the image data of the voucher 70 and the category is detected. In the following description, the components common to the first embodiment are denoted with the same reference numerals, and the detailed description thereof is omitted.

In the second embodiment, the operation of creating and providing notification of the electronic data of the voucher 70 by email is the same as that in the first embodiment. In the second embodiment, in the document management apparatus 10 receiving the reception notification of the email 80, the operation of acquiring and storing the image data of the voucher 70 is different from that in the first embodiment.

FIG. 9 is a flowchart illustrating the processing executed by the processor 11 of the document management apparatus 10 in accordance with the voucher management program according to the second embodiment. The contents of various processing described below are merely examples, and various processing capable of obtaining the same results can be appropriately used.

If the voucher management program is started, the processor 11 waits until the voucher email 80 is received via the communication interface 14 (Act 51). If the voucher email 80 is received (Yes in Act 51), the processor 11 stores the message data 82 corresponding to the voucher email 80 in a predetermined volatile memory area of the main memory 12.

Here, the processor 11 functions as the reception module by executing the processing in Act 51 and Act 52 in cooperation with the communication interface 14.

The processor 11 extracts the download address from the message data 82 (Act 53). Then, the processor 11 accesses the download address via the communication interface 14 to requests download of the data (Act 54).

The processor 11 of the document management apparatus 10 requesting the download determines whether the download is complete (Act 55). If the download is not completed within a predetermined time after the download is requested (No in Act 55), the processor 11 displays a message indicating that the download is impossible with the display device 16 (Act 56).

If the download is complete (Yes in Act 55), the processor 11 stores the downloaded data, i.e., the image data of the voucher 70 in a predetermined volatile memory area of the main memory 12 (Act 57). The processor 11 executes a character recognition processing on the image data stored in the volatile memory area to recognize the voucher code 71 arranged at a predetermined position of the voucher 70 (Act 58). In this manner, the document management apparatus 10 implements a character recognition program so that the character recognition processing can be executed by the processor 11. The character recognition program is stored in the main memory 12 or the auxiliary storage device 13.

If the recognition of the voucher code 71 is completed, the processor 11 identifies the item classification corresponding to the item D from the voucher code 71 (Act 59).

Here, the processor 11 functions as a detection module by executing processing in Act 57 and Act 58.

The processor 11 searches the sorting table 132 according to the item classification detected from the voucher code 71 and detects the storage destination folder name set corresponding to the item classification. Then, the processor 11 determines the voucher folder 131 having the folder name matching the storage destination folder name as the electronic data storage destination of the voucher 70 notified by the voucher email 80 (Act 60). The processor 11 stores the image data of the voucher 70 in the voucher folder 131 determined as the storage destination (Act 61).

Here, the processor 11 functions as the sorting module by executing the processing in Act 60 and Act 61.

In the second embodiment which operates in this manner, the same operation effect as in the first embodiment can be achieved.

In the second embodiment, the voucher code is acquired by executing the character recognition from the image data of the voucher 70. Therefore, the voucher code can be omitted from the message data of the voucher email 80.

Modifications of the embodiment are described below.

In each of the above embodiments, storage areas as a plurality of the voucher folders 131 are in the auxiliary storage device 13 of the document management apparatus 10. The storage area as the voucher folder 131 may be a storage device which is an external device connected to the document management apparatus 10. In this case, the processor of the document management apparatus 10 may simply output the image data of the voucher 70 to the external device together with the storage destination folder name specified by the item classification detected from the voucher code 71.

In the first embodiment, a case in which the voucher code is detected from the message data 82 of the voucher email 80 is exemplified. In the second embodiment, a case in which the voucher code is detected (recognized) by executing the character recognition on the image data of the voucher 70 is exemplified. Detection of the voucher code is not limited thereto. For example, the voucher code may be included in the download address included in the message data 82 of the voucher email 80 as it is or in an encrypted manner, and the processor 11 may analyze the download address to detect the voucher code.

The operation of creating and receiving the electronic data of the voucher 70 by email is not particularly limited. For example, the input of item classification is not necessarily required. If the cash payer wishes to receive the voucher 70 as the electronic data, by receiving the input of the item classification at the POS terminal and including the input item classification in the voucher preparation data, the input of the item classification can be omitted. It is not necessary to input characters for the address and the email address. If the cash payer is a member such as a point member or the like, the address and the email address may be acquired from a database in which member information is stored in advance.

Whether the received email is the voucher email 80 may be determined based on items other than the title of the header data 81. For example, the sender information of the voucher email 80 may be set in advance, and if the sender of the received email matches, the received email may be determined as the voucher email 80.

The document management apparatus 10 is generally provided with the voucher management program stored in the main memory 12 or the auxiliary storage device 13. However, the present invention is not limited thereto, and the document management apparatus 10 may be initially provided with the voucher management program not stored in the main memory 12 or the auxiliary storage device 13. In this case, the voucher management program individually transferred from the document management apparatus 10 may be written to a writable storage device of the document management apparatus 10 according to an operation of a user or the like. The transfer of the voucher management program can be executed by recording it on a removable recording medium or by communication via a network. The recording medium may be in any form as long as it can store a program such as a CD-ROM, a memory card and the like, and is readable by the apparatus. A function obtained by installing or downloading the program may be realized in cooperation with an OS (operating system) or the like inside the apparatus.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A document management system comprising a user terminal, first and second servers, and a document management apparatus, wherein:
    the user terminal is configured to
        acquire document preparation data for preparing a voucher by scanning a barcode printed on a receipt,
        receive from a user an input of an item classification and an email address of the document management apparatus, and
        transmit to the first server, the document preparation data, the item classification and the email address;
    the first server configured to
        generate, based on the document preparation data, the item classification and the email address, received from the user terminal, a voucher code that includes information indicating a classification of document contents,
        generate, based on the received document preparation data and the voucher, a voucher,
        store the generated voucher, and
        request the second server to send an email to the second terminal, the email including the voucher code and a storage address of the generated voucher; and
    the second server is configured to
        send the email, which includes the voucher code and the storage address of the generated voucher, to the second terminal; and
    the document management apparatus is configured to
        determine the classification of document contents from the voucher code included in the email received from the second server,
        determine a location where the voucher is to be stored based on the classification of document contents,
        download the voucher from the storage address of the generated voucher included in the email, and
        store the downloaded voucher in the determined location.

2. The system according to claim 1, wherein the user terminal further comprises:
    an input device,
    wherein the item classification is selected from a predetermined list using the input device.

3. The system according to claim 2, wherein the classification of document contents is one of a plurality of predetermined expense classifications.

4. The system according to claim 3, wherein the determined location is a previously designated folder corresponding to the predetermined expense classification of the document.

5. The system according to claim 1, wherein the user terminal is further configured to:
   read a document issue code on a receipt, wherein the document preparation data is acquired in response to reading the document issue code.

* * * * *